United States Patent
McGruder

[11] 3,813,517
[45] May 28, 1974

[54] BATTERY OPERATED COFFEE MAKER

[76] Inventor: Ivory McGruder, 7515 Kimbark, Chicago, Ill. 60619

[22] Filed: Jan. 4, 1973

[21] Appl. No.: 320,947

[52] U.S. Cl. ............................................. 219/438
[51] Int. Cl. .......................................... F27d 11/02
[58] Field of Search .......... 219/405, 432, 438, 439, 219/441, 442, 530

[56] References Cited
UNITED STATES PATENTS

| | | | |
|---|---|---|---|
| 2,735,926 | 2/1956 | Langlois | 219/528 |
| 2,753,436 | 7/1956 | Schwaneke | 219/441 |
| 2,785,277 | 3/1957 | Jepson | 219/438 X |
| 3,010,006 | 11/1961 | Schwaneke | 219/438 X |
| 3,026,399 | 3/1962 | Lighter | 219/405 |
| 3,644,709 | 2/1972 | Hojo | 219/439 |

FOREIGN PATENTS OR APPLICATIONS

| | | | |
|---|---|---|---|
| 98,516 | 4/1923 | Switzerland | 219/438 |
| 509,199 | 1/1955 | Italy | 219/438 |
| 115,421 | 12/1929 | Austria | 219/438 |
| 290,916 | 11/1966 | Australia | 219/438 |
| 413,519 | 3/1946 | Italy | 219/438 |
| 866,220 | 2/1953 | Germany | 219/438 |

*Primary Examiner*—Volodymyr Y. Mayewsky
*Attorney, Agent, or Firm*—Olson, Trexler, Wolters, Bushnell & Fosse, Ltd.

[57] ABSTRACT

A coffee brewer and more particularly small coffee brewer pots which make use of electrical current as heat source, includes a corrosion resistant and high heat conductivity inner metal chamber and abutting against outside peripheral surface of said inner chamber is a heat insulating material with the surface abutting against said outside peripheral surface of said inner chamber coated with a heat reflecting substance; a commercially available electrical heating element with low electrical resistance wherein the absolute value of the electrical resistance being not less than one unit ohm while capable of carrying high electrical current, is positioned securely and resting on the outside bottom surface of said inner chamber while at the same time, trapped in place by the inner bottom of said insulating material with spacers. An outermost chamber encloses whole assembly, providing another heat insulating air gap and to which a convenient handle is securely attached and an integral base stand. A female receptacle on line cord to receive the male prongs of the heating element is provided together with the corresponding and separate electrical wires to which alligator clips are mechanically and electrically connected.

2 Claims, 3 Drawing Figures

BATTERY OPERATED COFFEE MAKER

BACKGROUND OF INVENTION

1. Field of Invention

The present invention relates to a coffee brewing device and more specifically to a device of the type which is used to brew or make a not too large amount of coffee or tea without the benefit of a stove, hot plate, direct flame or fire and a convenient household electrical outlet as a heat source.

2. Description of Prior Art

In actuality, several automatic electrical coffee brewers are in use today which are very convenient; convenient only if an alternating current outlet is available. Designs of automatic electrical coffee brewers are centered on using alternating current. Likewise, one or two warming devices, used to warm coffee, tea and other beverages that use direct current from a battery such as an automatic battery are available. A difference between said beverage warming devices and the present invention is that the present invention is designed to brew or make coffee using a vehicle battery such as an automobile, trailer, boat and the like.

SUMMARY OF THE INVENTION

Being an avid outdoor person with freshly brewed coffee or tea as a favorite, building a fire out of doors such as during a fishing trip, hunting or just camping is somewhat a frustration, not mentioning the overall disadvantages, selecting a spot to build a fire, gathering firewood, starting the fire, hooking up the coffee pot over the fire and keeping a watchful eye over the fire in the event it will spread, just to mention a few.

It is one object of the invention to provide a coffee brewing device that is effective in using, as a heat source, vehicle batteries such as automobile, boat and trailer batteries and the like.

It is yet another object of the present invention to offer a highly effective, very low heat loss coffee making device through the use of simple arrangement on insulating materials and chambers.

It is yet a further object of the present invention to offer a portable and ruggedly inexpensive coffee brewing means specifically for outdoorsmen.

It is also another object to offer a coffee making device that can be easily adapted to an alternating current outlet through the use of commercially available direct current to alternating current adapter plugs or receptacles.

Additional objects and advantages of the present invention will clearly surface from the following further description and accompanying drawing of preferred embodiments.

DESCRIPTION OF THE PREFERRED EMBODIMENTS

Figure 1:
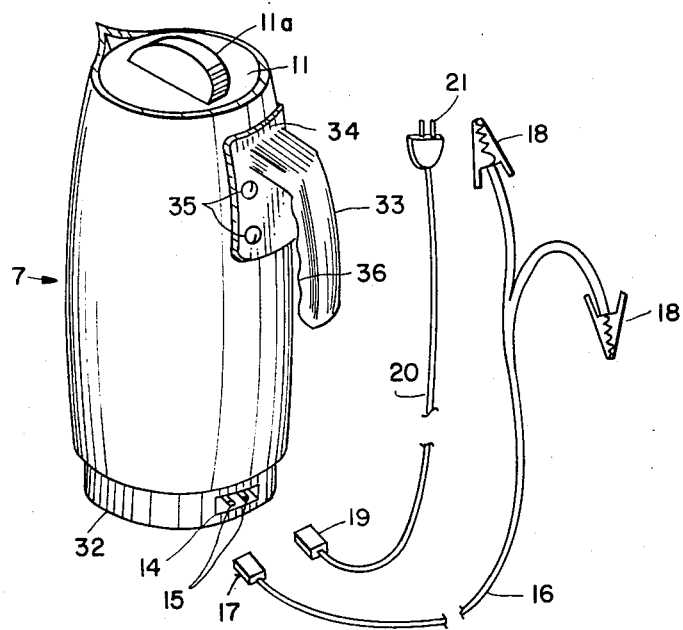
FIG. 1 is a plan elevation view of the invention including the required electrical receptacles.
Figure 2:
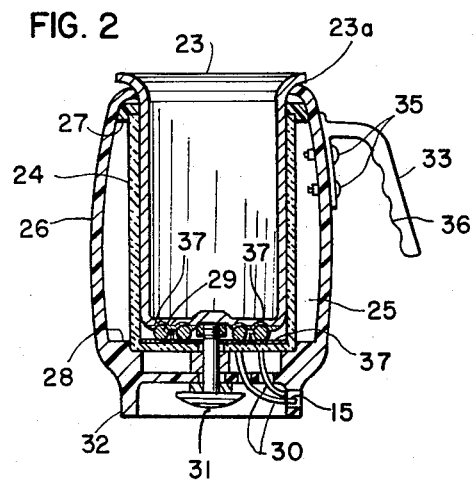
FIG. 2 is a longitudinal section view of the invention showing the arrangements of the chambers.
Figure 3:
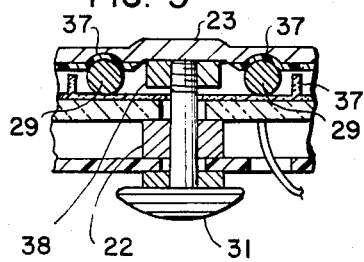
FIG. 3 is an enlarged view of the bottom screw and nut.

Referring now more particularly to the drawings, there is illustrated a device for brewing or making coffee or tea designated by the numeral 7.

The said device 7 comprises a top cover 11 with cover handle 11a, a handle 33 used to lift said device in the process of pouring freshly brewed coffee, wherein said larger handle 33 is removably securely affixed to outer tubular housing 26 by means of screws 35 located on the complimenting surface portion 34 which is an integral part of the handle 33 thereof and on the gripping portion of said handle 33 are sinusoidal indentations 36 for easy non slip grip.

The outer tubular housing 26 which can be a molded tough high impact plastic and reasonably heat resistant has an integral circularly hollow base stand 32 and an enclosed bottom located further inside from the end of the stand, and a window 14 opens out of a side of the hose forming the receiving connecting receptacle having the male prongs 15 of the heating element 29 protruding therethrough. Longitudinally spaced apart and rigidly positioned on the inside cylindrical surface of the housing 26 are the top spacers 27 and lower spacer 28. The spacers maintain the insulating air gap 25 between housing 26 and the reflector tubular housing 24 which is coated with a heat reflecting substance abutting against the outside cylindrical surface of an inner tubular housing 23. The inner tubular housing 23 contains at the outside bottom surface slight convolutions wherein the heating elements 29 are immovably positioned thereof together with spacers 37 disposed atop, beneath, and between the heating elements to prevent, though remote, the heating elements 29 from touching one another. The end leads 30 of the heating elements 29 are brought out and mechanically and electrically connected to the prongs 15 and rigidly positioned in place on the window 14.

The inner housing 23 also contains integrally, a receiving female screw nut 38 located on the dead center of the outside bottom surface. The outwardly open lip 23a of the inner housing 23 will trap in place all the inner assembly if the inner housing 23 is forced vertically downward and this entrapment is accomplished by tightening the bottom screw 31 on the female screw nut 38 which is previously described as an integral part of the inner housing 23. A spacer 22 is provided to give a larger supporting area between reflector housing 24 and the bottom of housing 26.

The power line cord 16 with the female receptacle 17 with the required alligator clip connectors 18 will be used for deriving heat from vehicle batteries, while cord 20 with the corresponding receptacle adapter 19 and standard male plug 21 will be used on any convenient alternating current outlet.

A short discussion on the statement that the electrical resistance of the heating element should not be less than one unit ohm in value is believed appropriate. The heating effect of an electrical current is directly proportional to the product of the square of the current value and the electrical resistance. Since the driving force which is the voltage of the battery is constant, that can be varied, hence a resistance value is selected so that the amount of current drawn from a battery is not excessive, that may deteriorate the stored capacity of the battery.

I claim:

1. A battery operated coffee maker comprising an outside tubular housing having a horizontal closed bottom end and a top open end interconnected to the bottom end by vertical side walls of a convex longitudinal shape, a radially inwardly extending annular rim defined about the edge of the top open end, the interior surfaces of the bottom end and side walls defining a chamber therebetween, a circular recess formed in the interior of the bottom end concentric therewith and extending vertically downward therefrom, a similar circular recess formed in the exterior surface of the bottom end opening out of the bottom exterior surface and extending vertically upward therefrom concentric with the outside housing, an annular shoulder having a diameter greater than the diameter of the interior bottom surface recess and disposed concentric about the top edges of said recess, a thermal insulating and reflecting tubular housing having a closed bottom and vertically depending side walls extending upwardly from the peripheral edges of the bottom terminating in a top open end, the exterior diameter of the reflector tubular housing being substantially equal to the diameter of the shoulder formed in the compartment bottom surface with the reflector housing bottom being received in seated engagement on the shoulder with the top of the reflector housing received inwardly of the opened top end of the outside housing, a ring shaped spacer disposed about the exterior peripheral circumferal edges of the top end of the reflector housing and extending radially outwardly therefrom to engage the interior side walls of the outside housing to maintain the reflector housing vertically disposed in the compartment of the outside housing, an inner tubular housing having a bottom surface with depending cylindrical vertically upward directed side walls terminating in an outward radial directed lip portion is provided having a liquid receiving compartment defined interiorly thereof, the exterior diameter of the inner tubular housing being just slightly less than the interior diameter of the reflector housing and adapted to be telescopically received axially therein through the open top end thereof to a position where the exterior underneath portion of the lip engages and overlaps the radially inwardly annular rim of the outside housing forming a tight seal therewith, there being defined between the exterior bottom surface of the inner housing and the interior bottom surface of the reflector housing a circular compartment adapted to receive therein a plurality of electrically interconnected heating elements, an electrically insulating spacer disposed atop, beneath and in between the heating elements to electrically insulate the same from contact with each other and also from contact with the surrounding surfaces, the exterior surface of the inner housing bottom provided with a series of convolutions formed therein of a size and configuration adapted to firmly seat the insulating liner and the associated heating elements in a manner to firmly entrap the heating elements between the reflector housing and inner housing to fixedly retain the heating elements in position, the heating elements being electrically connected to a pair of male projections disposed in a compartment in the side wall of the base portion of the outside housing and opening outwardly of the same adapted to receive an electrical plug for the electrical energization of the heating elements, the portion of the chamber of the outside housing disposed intermediate the exterior side wall surfaces of the reflector housing and the interior side wall surfaces of the outside housing defining a closed dead air space serving to further thermally insulate the reflector housing and inner housing from the surrounding ambient atmosphere, a member welded to the exterior bottom surface of the inner housing bottom end and having formed therein concentric with the bottom end a threaded aperture extending axially therethrough, an aperture disposed centrally of the reflector bottom end and extending axially therethrough of a diameter slightly greater than the diameter of the threaded aperture in the member secured to the reflector bottom end, an aperture disposed centrally of the outside housing bottom surface and extending axially therethrough, a spacer member of a thickness equal to the height of the recess formed interiorly of the outside housing chamber bottom surface and having an aperture extending completely therethrough and adapted to be placed in axial alignment with the aperture formed in the outside housing bottom surface, and an elongated cylindrical member having an enlarged head portion and a terminal end threaded portion adapted to be axially inserted through the aligned apertures in the outside housing bottom surface, spacer member, reflector bottom surface, and threadedly received in the threaded aperture in the member welded to the inner housing exterior bottom surface in a manner to securely lock all of the individual components together in a secure manner while yet permitting ease of repair and replacement of any or all components, and a handle member fixedly attached to the exterior side wall surface of the outside housing, and a circular disc shaped cover having a handle on the top surface thereof and adapted to be axially inserted into the open end of the inner housing in a manner to sealingly close the same, while being readily removed therefrom and replaced thereonto in the operation of the device.

2. The battery operated coffee maker as set forth in claim 1 further comprising a flexible electrical extension cord having one end adapted to be detachably attached to the electrical projections on the base of the outside housing to make electrical connection therewith, with the opposite end having a spring loaded alligator type clip associated therewith and making electrical connection therewith adapted to be connected to a suitable power source, such as the battery of an automobile and the like.

* * * * *